G. C. PHARO.
AUXILIARY CONTROL FOR SPEED GOVERNORS.
APPLICATION FILED MAR. 20, 1917.

1,250,219.

Patented Dec. 18, 1917.
3 SHEETS—SHEET 2.

G. C. PHARO.
AUXILIARY CONTROL FOR SPEED GOVERNORS.
APPLICATION FILED MAR. 20, 1917.
1,250,219.
Patented Dec. 18, 1917.
3 SHEETS—SHEET 3.
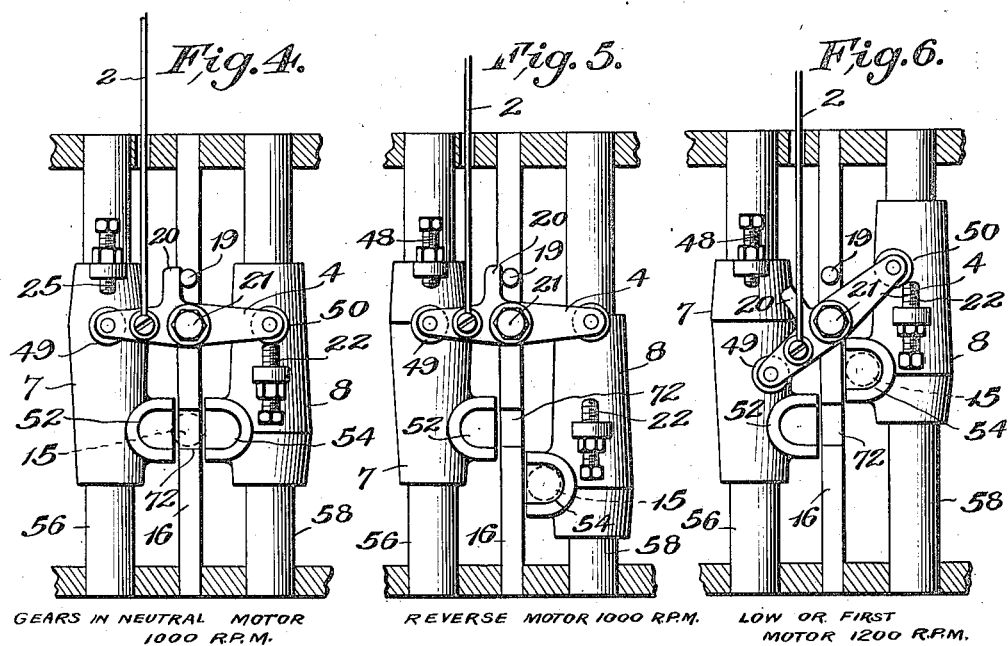
GEARS IN NEUTRAL MOTOR 1000 R.P.M.
REVERSE MOTOR 1000 R.P.M.
LOW OR FIRST MOTOR 1200 R.P.M.
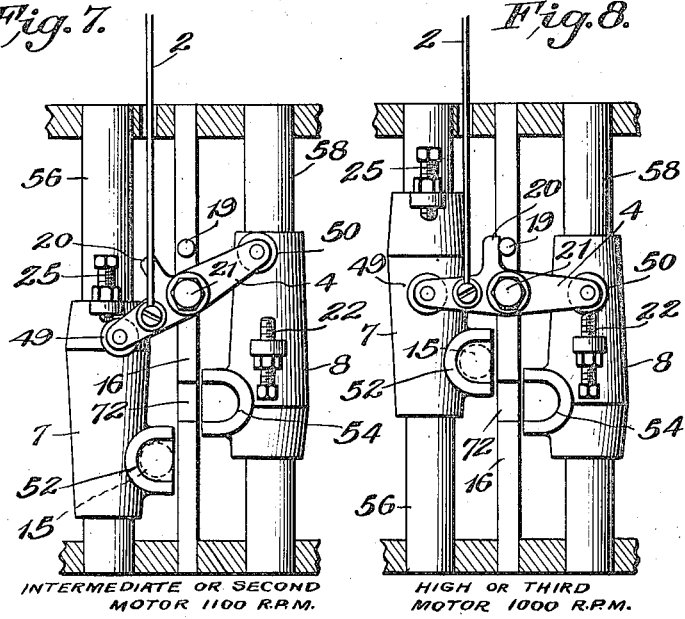
INTERMEDIATE OR SECOND MOTOR 1100 R.P.M.
HIGH OR THIRD MOTOR 1000 R.P.M.
Witness
Chas. L. Grieshauer.
Inventor
Gordon C. Pharo,
By C. A. Mason, Attorney

UNITED STATES PATENT OFFICE.

GORDON C. PHARO, OF MARYSVILLE, CALIFORNIA.

AUXILIARY CONTROL FOR SPEED-GOVERNORS.

1,250,219.		Specification of Letters Patent.		Patented Dec. 18, 1917.

Application filed March 20, 1917. Serial No. 156,017.

*To all whom it may concern:*

Be it known that I, GORDON C. PHARO, a citizen of the United States of America, residing at Marysville, in the county of Yuba and State of California, have invented certain new and useful Improvements in Auxiliary Controls for Speed-Governors, of which the following is a full, clear, and exact description.

This invention relates to means for controlling the speed of motor driven vehicles, such as automobiles, motor trucks, traction engines, etc., and more particularly to devices for controlling the speed of the motor in accordance with requirements of the road, simultaneously with the variations in gear ratio which are effected by the usual transmission.

One object of the invention is to provide a simplified method of automatically varying the governed speed of a motor driven vehicle or tractor so that the motor speed is increased as the gear ratio is increased, or vice versa, which results in allowing the motor to develop more horse power on the lower gears to negotiate steep grades, or to pull the vehicle out of ruts or over rough surfaces which may be encountered, and to develop relatively less horse power on the higher gears, or when the motor is running idle, and thereby to prevent undue racing of the motor, and also to economize in the fuel used.

Another object of the invention is to provide means, which is adjustable, for varying, at the will of the operator, the speed of the motor during different positions of the gear shift mechanism so that for each gear ratio a given speed of rotation may be developed, such speed being predetermined in accordance with the load on the vehicle, or the conditions of service to which said vehicle may be subjected. This object is accomplished by adjusting devices which are capable through simple manipulation of being so set as to determine the amount of movement of a part which causes the governor for the motor to permit the development of the required speed of rotation for each movement of the gear shifting device which effects a change in the gear ratio. I regard this as a highly important feature of the invention.

Another object of the invention is to provide, in connection with a fluid governor having a rotary impeller which controls the engine speed by differences in pressure, means, as a spring which may be tensioned through the gear shifting mechanism to modify the action of the governor predeterminately in accordance with the gear ratio between the motor and the vehicle, thus controlling the engine speed automatically in accordance with the requirements of the road, and in a reliable and superior manner.

In the embodiment of the invention illustrated herein, the adjusting device which acts through the governor is attached to the gear shifting mechanism in the transmission case, so that as the gears are shifted from one position to another the action of the governor is changed through an auxiliary spring which is attached to the throttle lever, or other moving part connected with the governor.

The invention is illustrated as embodied in a preferred construction, but is not confined in its application to the particular embodiment described and shown herein, as it may be embodied in various other forms or modifications which are substantially the same in principle or mode of operation, but differ widely as to their details of construction and arrangement of parts.

Referring to the accompanying drawings.

Figs. 4 to 8, inclusive, are views illustrating, diagrammatically, the several positions assumed by the auxiliary spring controlling lever when the gears are shifted to give the various changes in gear ratio common in the usual transmission mechanism.

Figure 1:
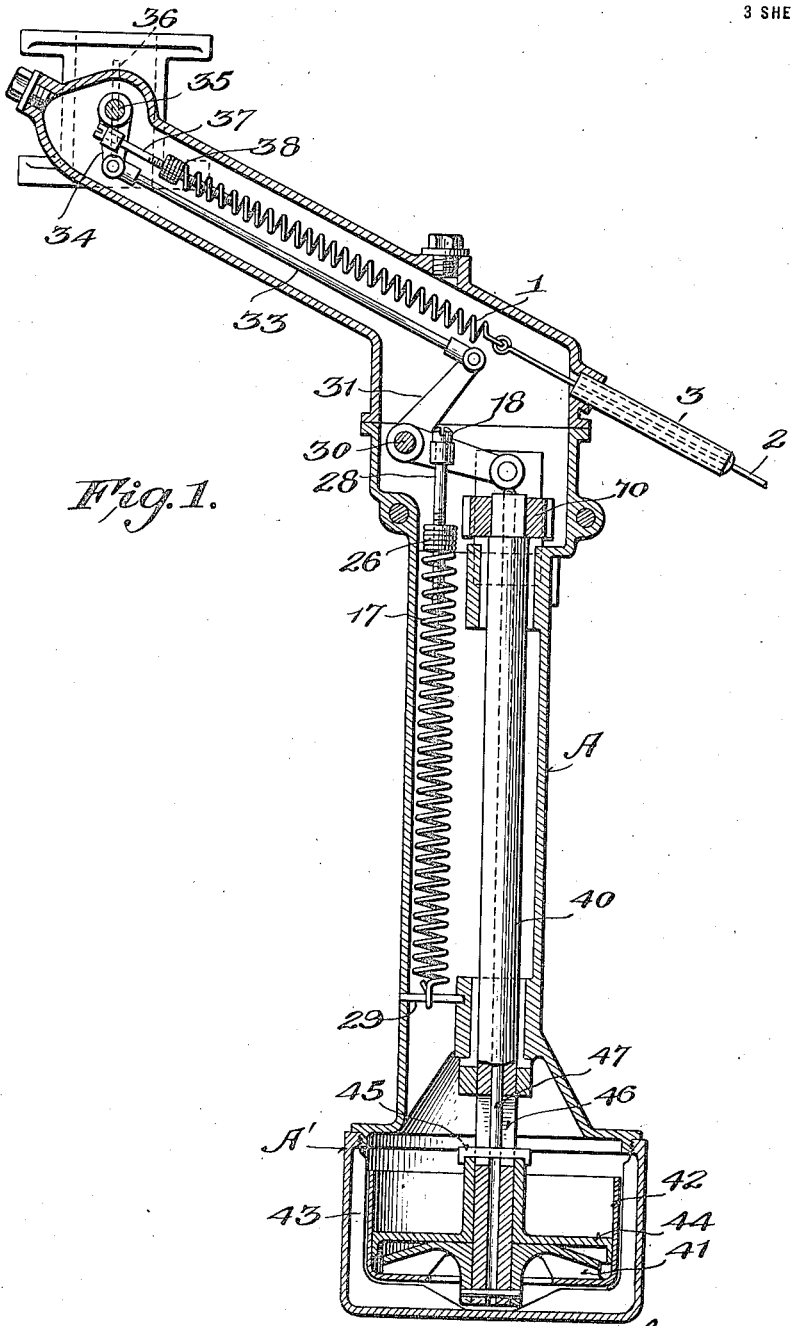
Figure 1 is a view in longitudinal section illustrating a preferred form of governing device for a motor, and the auxiliary spring operated by the gear shifting mechanism.

Referring first to Fig. 1, a casing A, which contains the governor mechanism, has attached thereto a hollow base portion A', the latter containing a rotary centrifugal impeller 41 which is carried rigidly at the lower end portion of a hollow shaft 40, supported in spaced bearings within the frame A. The impeller 41 is inclosed in a cup-shaped cylinder 42, and is provided with inlet openings near its hub through which liquid flows when the impeller is rotating, said liquid being discharged by centrifugal action from the impeller, thus creating a pressure on the lower surface of a piston 44, fitting within the cylinder 42. An extended sleeve portion of the piston acts, through a key 45 which reciprocates in a slot 46 formed in the shaft 40, to transmit pressure to a rod 47, which slides in a bore formed centrally of the shaft. The upper end of the rod 47 acts upon one arm of a bell crank 31, pivoted at 30 to the casing A, the other arm of the bell crank being pivotally connected to a rod 33 which in turn is pivoted to an arm 34 shown herein as rigidly connected to the shaft 35 of the throttle valve 36, for controlling the admission of fuel to the motor.

The shaft 40 is connected, as by a gear 70, to a rotatable member driven by the motor and through which the impeller 41 is rotated at a speed which is always proportional to the speed of rotation of the motor. Movement of the throttle valve 36 through pressure applied beneath the piston 44 by the discharge of liquid from the impeller is resisted by a spring 17. This spring has its lower end connected to a rigid part of the casing, as by a pin 29, and its upper end is attached to a stem 28 which is connected with the lower arm of the bell crank 31, the connection between such stem and spring being through an adjusting nut 26 which is threaded to the stem. The upper end of the stem is shown as provided with a slot to enable it to be turned by a screw driver, for adjusting the tension of the spring 17, and hence for controlling the action of the governor on the throttle valve. It will be understood from the construction described that the speed of rotation of the impeller 41 being dependent upon that of the motor, the higher such speed of rotation the greater will be the pressure of the liquid forced by the impeller 41 against the piston 44, with the result that the spring 17 may be adjusted to regulate the opening of the throttle valve 36 in such a manner that the speed of rotation of the motor may be controlled by the governing device, and such speed may be maintained at that which is most desirable when the motor is running free and not connected with its load.

It will also be understood that the base portion A' of the casing A is filled with a liquid, such as oil, which is pumped by the impeller 41 into the cylinder 42 beneath the piston 44, thus creating a pressure which is instrumental in actuating the throttle valve of the engine when such pressure is sufficient to overcome the tension of the spring 17, thus closing the valve more or less as the speed of the engine increases. When, on the other hand, the speed of the engine has decreased to that extent which will permit the spring 17 to overcome the pressure exerted beneath the piston 44, the latter will be caused to move reversely and the fluid will be forced backward through the impeller 41, and into the casing A', thus permitting the throttle valve to open, more or less, to admit more fuel to the engine and effect an increase of its rotative speed. The interior walls of the casing A' are shown as provided with vanes 43 which prevent such undue rotation of the liquid in the casing as would interfere with the proper action of the rotary impeller.

The action of the governor above described is controlled by the mechanism for shifting the usual change gears, or differential, through an auxiliary spring 1, herein shown as connected at one end through an adjusting nut 38 and rod 37 with the arm 34, and secured at its outer end to a rod or wire 2 which is inclosed in a casing 3, and extends to and is connected with one arm of a controlling lever 4, which is pivoted to a bar 16 in the gear casing 71. Any movement, therefore, of the lever 4 is, through the wire 2, caused to increase or decrease the tension of the auxiliary spring 1, so that the amount of governor pressure necessary to close the throttle valve 36 will be varied as the position of the lever 4 is shifted. As the pressure generated by the governor is dependent entirely upon the speed at which the governor is rotated it naturally follows that as the pressure is changed the speed of the engine which is necessary to close the throttle valve will be varied in proportion to the amount of tension placed on the spring.

Figure 2:
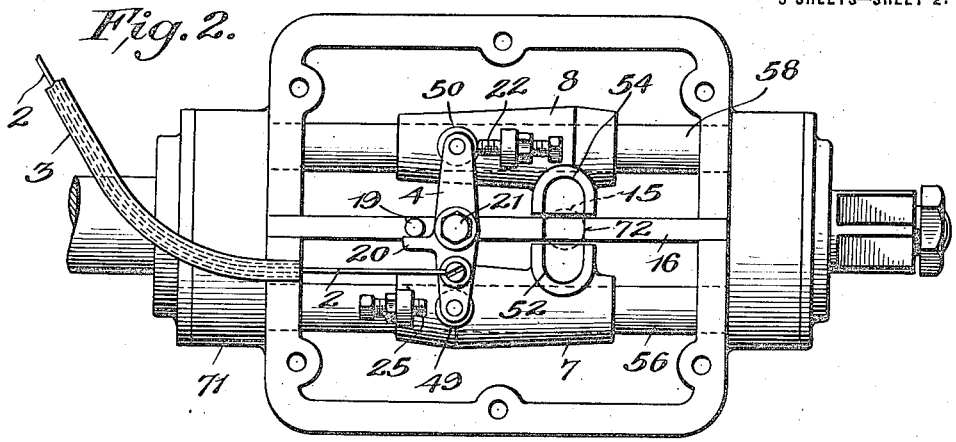
Fig. 2 is a plan view of a transmission gear casing with the cover removed, to expose certain parts of the present invention.
Figure 3:
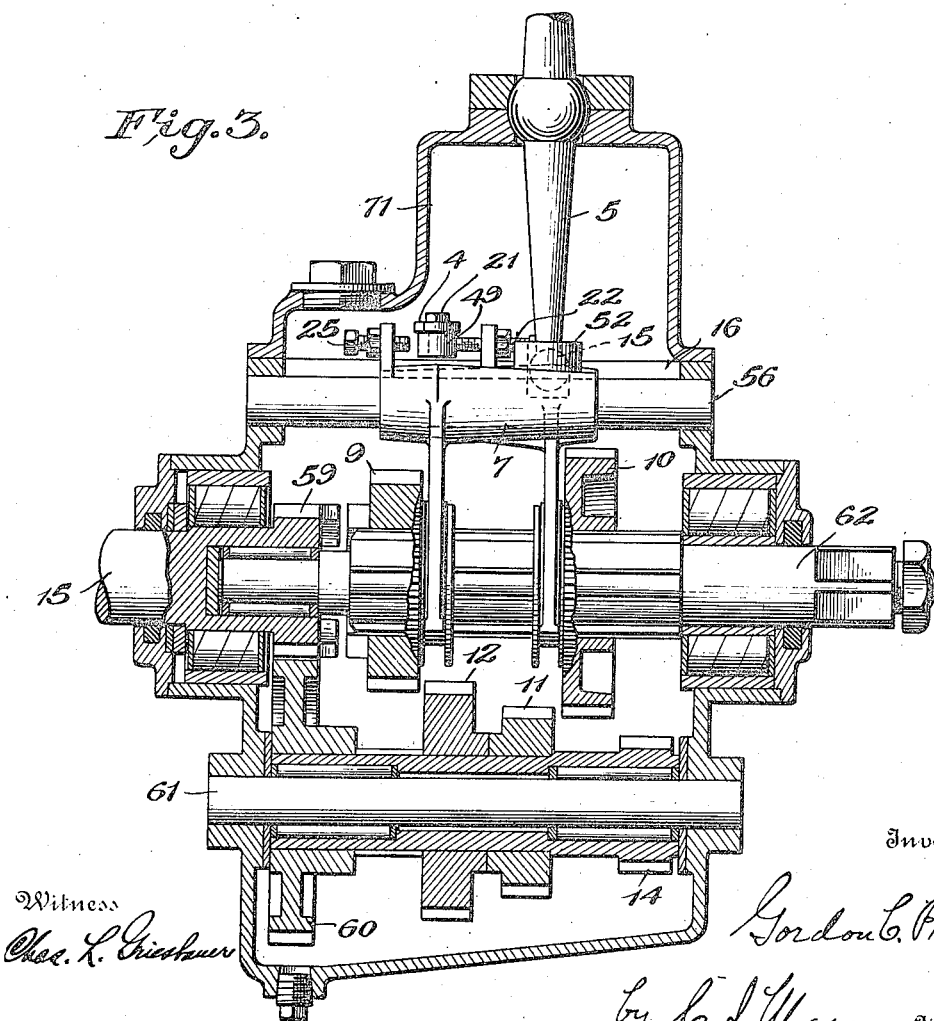
Fig. 3 is a view in longitudinal section of the gear casing and parts of the motor controlling mechanism.

The transmission mechanism illustrated in Figs. 2 and 3 is substantially the same as that which is commonly used on various kinds of motor driven vehicles, such as automobiles, auto trucks, traction engines, etc. The shaft 15 may be considered as having connection with the motor and carries a gear 59 meshing with a gear 60 carried by a shaft 61, which latter also carries the gears 12, 11 and 14. Another shaft 62, which is connected with the vehicle to be driven, supports for sliding movement thereon the gears 9 and 10, which are respectively connected with yokes through sleeves 7 and 8, that are mounted for sliding movements upon two parallel guides 56 and 58, rigidly secured in the casing, the sleeves having sockets 52 and 54, located upon opposite sides of the bar 16 and arranged to be engaged alternatively by the end 15 of the usual gear shift lever 5, which is shown herein as having a ball and socket connection with the casing 71 to permit the necessary movements for selectively shifting the gears 9 or 10. Figs. 2, 3 and 4 of the drawings show the several parts of the transmission in the positions they occupy when the gears are neutral. In order to shift the gears to the first or low position the sleeve 8 is moved by the gear shift lever to the position shown in Fig. 6, which causes the gears 10 and 11 to mesh.

The second or intermediate position of the gears is obtained by shifting the sleeve 7 into the position shown in Fig. 7, thus effecting engagement between the gears 9 and 12. When the high or third position of the gears is desired the sleeve 7 is moved into the position shown in Fig. 8 which causes the gear 9 to be moved from the position shown in Fig. 3 of the drawings toward the left, thus causing engagement between the jaws on the adjacent faces of the gears 9 and 59, and directly connecting the main driving shaft 15 with the driven shaft 62. In order to effect a reverse operation of the driven shaft 62, and hence of the vehicle wheels connected thereto, the sleeve 8 is moved into the position shown in Fig. 5, thus shifting the gear 10 until it engages an idler gear (not shown) which is normally in mesh with the gear 14.

The above detailed description of the operations necessary to effect the usual changes in selective transmission gears of the type herein shown has been given with a view to a better understanding of the operation of the auxiliary controlling mechanism.

Referring now more particularly to Figs. 4 to 8, inclusive, in these several views the dotted circle 15 represents the ball on the end of the hand shift lever 5, which is shown in the different positions that it assumes as the several changes in the gears are made.

In Fig. 4 the parts are shown as they appear when the gears are in neutral position, the hand shifting lever 5 being held in mid position by the transverse slot 72 in the bar 16. The controlling lever 4 is fulcrumed to this bar by a bolt 21 which forms a bearing on which it is free to turn. The controlling lever is provided with a projecting lug 20, which when the lever is in normal position is held against a stop 19 projecting from the bar 16, by the stress of the spring 1. The sleeve 7 is shown as carrying at one end an angular lug through which is threaded an adjustable stop screw 25, the end of the screw projecting more or less through the lug in position to be engaged by an anti-friction roll carried at one end of the lever 4. The sleeve 8 also carries a lug, about midway of its length, which is threaded for engagement by an adjusting screw 22, having one end projecting through the lug more or less and arranged to engage an anti-friction roll 50 carried at the other end of the lever 4. It will be noted that when the shifting yokes 7 and 8 are in the positions shown in Figs. 2 and 4, the lug 20 on the controlling lever 4 is held against the stop 19 by the spring 1, the tension of said spring being adjustable, through the rod 37 and nut 38. Assuming now that the main governor spring 17 has been so adjusted as to its tension that the maximum permissible engine speed will be 1000 R. P. M. when the controlling lever 4 is in the position just described. If the gear shift lever 51 now be so moved as to shift the sleeve 8 to the position as shown in Fig. 5, the gears will be in reverse, and this movement will not change the position of the controlling lever 4, and hence the action of the governor will not be modified by any change in the tension of the spring 1, and the motor will still be held at a speed of 1000 R. P. M.

If the sleeve 8 be shifted to the position shown in Fig. 6 the gears will then be in their low or first position. The movement of the sleeve 8 to effect such position of the gears will cause the screw 22 to engage the roller 50, swinging the lever 4 through a distance which is sufficient to tension the spring 1, thus so modifying the action of the governor as to permit an additional 200 R. P. M. of the motor, the speed whereof is now limited to 1200 R. P. M. This amount of additional speed which the motor is thus permitted to have may of course be varied by causing the set screw 22 to project more or less, in accordance with the requirements of the vehicle. It will be seen, however, that when the transmission is adjusted for low gear to permit the vehicle to overcome steep grades, or unusually heavy road conditions, the act of shifting the gears automatically increases the permissible motor speed in order that additional horse power may be available at the time it is most required. It will also be seen that the amount of additional horse power which is available during this position of the gears is adjustable, and may be varied to meet the requirements of the vehicle.

When the sleeve 7 is shifted to the position shown in Fig. 7 the second or intermediate gears are in mesh and in this position the screw 25 has been caused to engage the roll 49 for a portion of its travel only so that the total movement of the controlling lever 4 is less in this case than where the gears were shifted into the low or first speed position, as shown in Fig. 6, with a corresponding decrease in speed for the intermediate gear position as compared with the former. We will assume that when the gears are in intermediate position the amount of increased tension placed upon the spring 1 is sufficient to add 100 R. P. M. to the motor so that the speed limit will be 1100 R. P. M.

In the position in which the parts are shown in Fig. 8, the sleeve 7 has been shifted reversely to the direction in which it was moved to assume the position shown in Fig. 7, and the direct or high gear is in use. In moving from the intermediate to the high position the controlling lever 4 was returned to its original position where the lug 20 is held against the stop 19, and no extra strain is placed upon the spring 1 so that the motor speed is reduced by the governor to 1000 R. P. M. which we may assume, for example, to be equal to 15 miles per hour road speed for the vehicle being governed.

When the device is used on a vehicle equipped with a transmission having four forward speeds instead of three as described, the details of the parts would be changed slightly to conform to such a design, but in general principles the operation would be the same as for a three speed transmission. In view of the extreme simplicity of the device, it is obvious that there are a number of ways in which the same results may be obtained by attaching the connection of the auxiliary spring 1 to other moving parts of the transmission. The important feature of the invention and from which the beneficial results which have heretofore been pointed out follow, is the employment of means which is capable of adjustment, and is operable through the transmission mechanism of a motor driven vehicle, to control the governed speed of the motor when the gears are shifted to produce different gear ratios.

The device as described embodies many features that are decidedly superior over other governing devices which have heretofore been employed for the purpose of accomplishing like functions, as for example, where a governor is driven from one of the vehicle wheels or from the propeller shaft to control the road speed and which governor operates only when the vehicle has its maximum speed, thereby leaving the motor ungoverned when the clutch is out or the gears are in neutral position, with the consequent injurious effects which follow from an undue racing of the motor.

The present invention has the advantage of being controlled at all times regardless of whether the clutch is out or in. Moreover, in place of a long flexible drive shaft to transmit power from the wheel or propeller shaft to a governor, which is a constant source of trouble, the present invention merely requires a steel wire, which may be forced through a tubing and is not subject to wear or breakage. The entire device is easily sealed so that it is impossible for it to be tampered with.

That feature of the present invention which allows an adjustment to be made for each change of gear is an important one as it permits the operation of a motor on high gear at a speed which will give maximum life consistent with high efficiency, and when in low gear it will give a speed which will develop the maximum horse power required at such time, and at the same time will prevent overspeeding which is so injurious to the motor.

It is to be understood that the controlling wire 2 may be arranged for attachment to the main governor spring 17, instead of to the auxiliary spring 1, as the operation of such a modification would serve to increase or to decrease the amount of tension on the main governor spring, the same connection for adjustment of the governor spring being in this case used as that which is shown and described in my prior U. S. Patent No. 1,222,985, granted April 17, 1917.

Having thus described my invention, what I claim as new and desire to secure by Letters Patent of the United States is:

1. The combination with a motor governor, of variable speed transmission mechanism, means to shift the same, and adjustable connections between said shifting means and said governor to independently vary the effect of the governor on the motor for different gear shifts, whereby the permissible motor speed for any given change of gears may be controlled at the will of the operator.

2. The combination with a motor of a governor therefor, variable speed transmission mechanism for said motor, shifting means for said mechanism, and means for controlling the effect of the governor on said motor when said means is operated to change the gear ratios, said means being adjustable to independently vary the permissible motor speed for any desired gear ratio.

3. The combination with a motor governor, of a variable speed gear, shifting means therefor, means operated by said shifting means to vary the action of the governor on the motor as the gears are shifted and capable of adjustment to independently and variably predetermine the limit of speed of the motor for each change of gear.

4. The combination with a motor governor, of a variable speed gear, shifting means therefor, a spring between said shifting means and governor adapted to have its tension varied and thereby influence the effect of the governor on the motor when said shifting means is operated, and means for independently adjusting the amount of tension applied to said spring for each of a plurality of different positions of said shifting means, whereby the permissible motor speed may be varied, at will, for any desired gear ratio.

5. The combination with a motor governor, of a variable speed gear, shifting yokes for the gears, a controlling lever having a spring connection with said governor for effecting changes in the governor motor speed, and means capable of adjustment, to positively limit the movements of said lever when the yokes are moved to shift the gears.

6. The combination with a motor governor including a fluid pressure device for closing a valve and a spring for opening said valve, of a variable speed gear, shifting means for the gears, and independently adjustable connections between said shifting means and said governor to vary, at the will of the operator, the effect of the governor on the motor when the gears are shifted for any one of a plurality of gear ratios.

7. The combination with a governor comprising a fluid pressure device and a spring for controlling the speed of a motor, of a variable speed gear, shifting means for the gears, and connections between said shifting means and governor to modify the action of said spring on the governor controlled element of the motor as the gears are shifted, said connections being adjustable predeterminately to vary the permissible motor speed for any desired gear ratio.

8. The combination with a governor, comprising a rotary fluid impeller driven from a motor, of a piston actuated by differences in pressure created by said impeller and connected with a speed-controlling element of the motor, a spring acting in opposition to the pressure movement of said piston, a variable speed gear driven by the motor, shifting means therefor, and connections between said shifting means and governor to control the effect of the governor on the motor as the gears are shifted, said connections having provisions for independent adjustment to effect changes in the limits of the speed of the motor for each of a plurality of gear ratios.

9. The combination with a governor comprising a rotary centrifugal impeller rotated by a motor, and means for controlling the motor speed by differences in pressure due to the rotation of said impeller, of a variable speed gear driven by said motor, shifting means for said gear, a spring connection between said shifting means and governor to control the action of the governor on the motor when the gears are shifted, and means for independently varying the action of said spring on the governor for each of a plurality of gear ratios.

10. The combination with a motor of a governor therefor and means operated by the governor to control the speed of the motor, of change gears for the motor, yokes connected with said gears, adjustable stops carried by said yokes, a lever arranged for engagement by said stops and a spring connected with said lever and governor and arranged to variably control the action of the governor on the motor as the yokes are moved to shift the gears.

11. The combination with a motor of a governor therefor and means operated by the governor to control the speed of the motor, of change gears for the motor, yokes connected with said gears, adjustable stops carried by said yokes, a lever pivoted between said stops and arranged for engagement alternatively therewith, and a spring connecting said lever and governor for controlling the action of the governor on the motor when the gears are shifted.

12. The combination with a motor governor comprising means operated from the motor for limiting the rotative speed of the motor, of variable speed gear mechanism for the motor, shifting means for the gears of said mechanism, connections between said shifting means and said governor for controlling the effect of the governor on the motor, and means capable of adjustment for independently controlling the speed limits of the motor for different gear shifts at the will of the operator.

In testimony whereof I have hereunto set my hand this 24th day of Feb'y A. D. 1917.

GORDON C. PHARO.

Witnesses.
    NELLIE L. AHEARN,
    J. W. WOODWARD.